US009827896B1

(12) United States Patent
Dankert

(10) Patent No.: US 9,827,896 B1
(45) Date of Patent: Nov. 28, 2017

(54) ADJUSTABLE CARGO NET AND QUICK RELEASE SYSTEM

(71) Applicant: Ronald S. Dankert, Truth or Consequences, NM (US)

(72) Inventor: Ronald S. Dankert, Truth or Consequences, NM (US)

(*) Notice: Subject to any disclaimer, the term of this patent is extended or adjusted under 35 U.S.C. 154(b) by 0 days.

(21) Appl. No.: 15/453,202

(22) Filed: Mar. 8, 2017

Related U.S. Application Data

(62) Division of application No. 15/409,998, filed on Jan. 19, 2017.

(51) Int. Cl.
*B60P 7/08* (2006.01)

(52) U.S. Cl.
CPC ............ *B60P 7/083* (2013.01); *B60P 7/0853* (2013.01); *B60P 7/0876* (2013.01)

(58) Field of Classification Search
CPC ........ B60P 7/083; B60P 7/0876; B60P 7/0853
USPC ......... 410/12, 97, 100, 103, 118; 24/265 CD
See application file for complete search history.

(56) References Cited

U.S. PATENT DOCUMENTS

| 8,974,158 B1* | 3/2015 | Hatch | B60P 7/0876 410/117 |
| 2014/0255120 A1* | 9/2014 | Simmons | B60P 7/0823 410/100 |

* cited by examiner

*Primary Examiner* — Stephen Gordon
(74) *Attorney, Agent, or Firm* — Ryan Kromholz & Manion, S.C.

(57) ABSTRACT

A cargo containment system is disclosed comprising a series of length adjustable anchor straps carried by a truck, a series of rings slidably carried by said anchor straps, and a series of length adjustable lateral straps coupled between adjacent anchor straps about said rings to define an adjustable flexible lattice of cargo containment function.

4 Claims, 4 Drawing Sheets

US 9,827,896 B1

ADJUSTABLE CARGO NET AND QUICK RELEASE SYSTEM

RELATED APPLICATION

This application is a Division of co-pending U.S. patent application Ser. No. 15/409,998, filed 19 Jan. 2017.

BACKGROUND OF THE INVENTION

This invention relates to a modular and flexible cargo net system and improvements to associated components, such as ratchet straps and ring connections. The invention is particularly suited for situations where it is desirable to secure a carried load, for instance (but not limited to) in a bed of a truck.

SUMMARY OF THE INVENTION

A magnet grip cargo net system is disclosed. An anchor strap is provided, and a loop with a plurality of engagement rings. A ring is placed about a first end of a webbing strap, and the first end of the webbing strap is threaded through an anchor, for instance in a truck bed. An additional ring is placed about the webbing on a second side of the anchor. The first end of the webbing strap is placed through a second anchor, and a third ring is placed about the first end of the webbing strap. The first end of the webbing strap is then threaded through the second ring and into a ratchet mechanism which is subsequently tightened.

A plurality of s-hooks (preferably magnetic, for instance as disclosed in U.S. Pat. No. D765,498) carrying additional webbing are placed into each ring, A plurality of straps are anchored to the truck bed anchor system and a grid of straps is created.

A plurality of straps are woven through a series of rings laid atop webbing strap. The webbing is threaded over the ring, under the webbing, and then up through the ring again and through, loosely securing the rings to the lateral webbing. Preferably the ring is placed atop the anchor webbing to avoid damaging a load carried beneath the webbing.

A webbing lattice is created that is adjustably tightened to secure a load.

The rings can be slidably adjusted across the webbing for customized load securement.

DESCRIPTION OF THE PREFERRED EMBODIMENT

Although the disclosure hereof is detailed and exact to enable those skilled in the art to practice the invention, the physical embodiments herein disclosed merely exemplify the invention which may be embodied in other specific structures. While the preferred embodiment has been described, the details may be changed without departing from the invention, which is defined by the claims.

Figure 1:
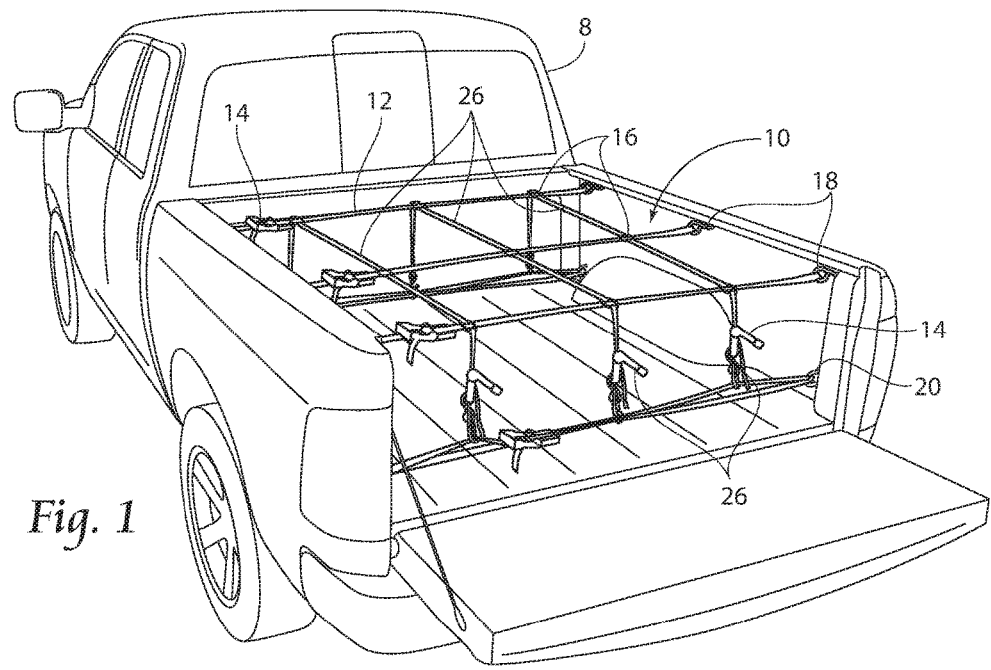
FIG. 1 is a rear perspective, in-use view of a cargo net system of the present invention.

Referring now to FIG. 1, a rear perspective, in-use view of a cargo net system 10 of the present invention is shown, carried for exemplary purposes in a bed of a truck 8. A series of anchor straps 12 are provided about the bed of truck 8, secured preferably to truck anchors 20 commonly present in truck beds. Together with interconnected lateral straps 26, anchor straps 12 provide a flexible, portable and modular cargo netting system as a webbing lattice for example.

In a preferred embodiment, anchor straps 12 and lateral straps 26 comprise a ratcheting mechanism 14 for securement to the truck 8 and about a cargo load (not shown) as tight as desired.

Figure 2:
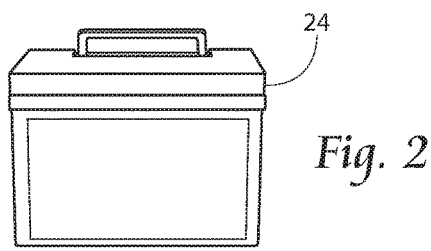
FIG. 2 is a side view of a carrying case dimensioned to store the cargo net system of the present invention.

Referring now to FIG. 2, a carrying case 24 dimensioned to store the cargo net system 10 of the present invention can be provided.

Figure 2A:
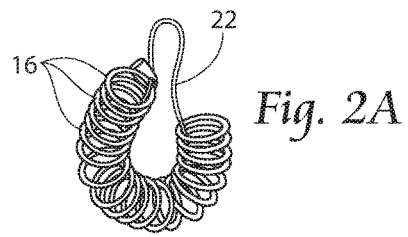
FIG. 2A is a perspective view of an exemplary series of rings carried by a ring carrying strap of the present invention.

As shown in FIG. 2A, a series of rings 16, the use of which will be described later, are removably carried by a ring strap 22.

Figure 3:
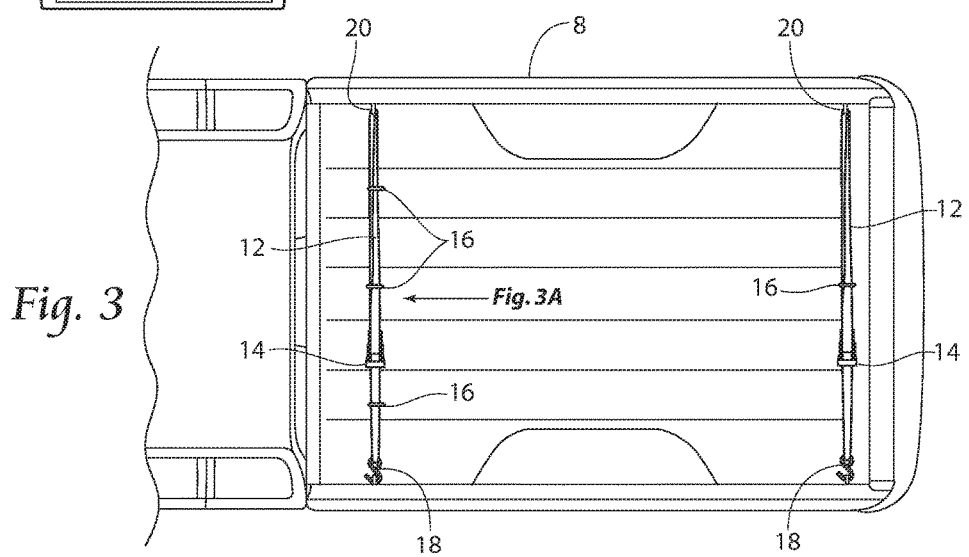
FIG. 3 is a top view of front and rear anchor straps of the cargo net system of the present invention.
Figure 5:
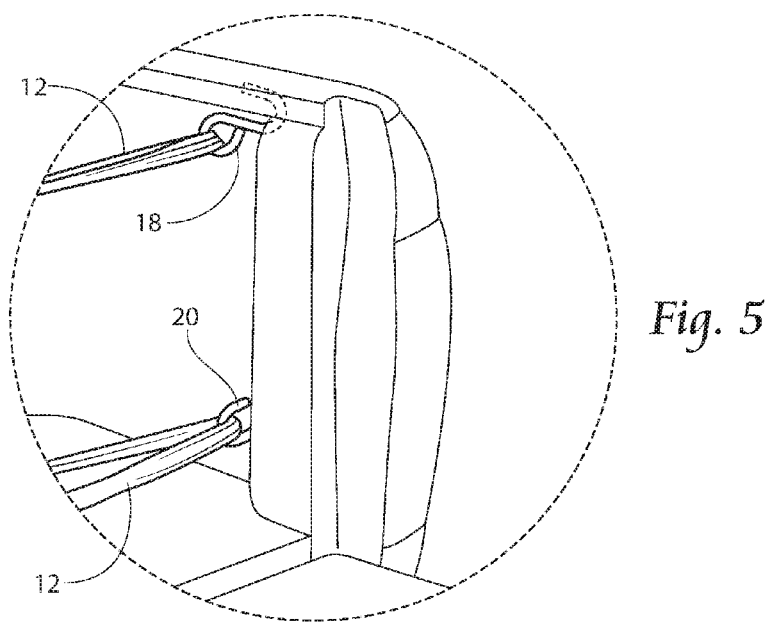
FIG. 5 is a close-up view of hooks and webbing coupled to a truck bed anchor system.

As shown in FIG. 3, a top view of front and rear anchor straps 12 of the cargo net system 10 of the present invention are shown. In a first cargo net system 10 installation step, now with reference to both FIGS. 1 and 3, a bottom anchor strap 12 is provided toward a front of the truck bed, at a low position in the bed. At least one ring 16 is provided about at least one strand of bottom anchor strap 12. This anchor strap 12 can either be coupled to truck anchors 20 either be threading a free end of anchor strap 12 through truck anchors 20 on both sides of the truck 8, or by securing s-hooks 19 (preferably magnetic) about truck anchors 20 (See, e.g., FIG. 5). A bottom anchor strap 12 is also preferably provided toward a rear of the truck bed, again at a low position in the bed.

Next, a series of upper anchor straps 12 are preferably provided toward the front, middle and back of the truck bed laterally crossing at least a portion of the bed, this time at a high position in the bed. Again, these anchor straps 12 can either be coupled to truck anchors 20 either be threading a free end of anchor strap 12 through truck anchors 20 on both sides of the truck 8, or by securing s-hooks 19 (preferably magnetic) carried by straps 12 about truck anchors 20.

Figure 3A:
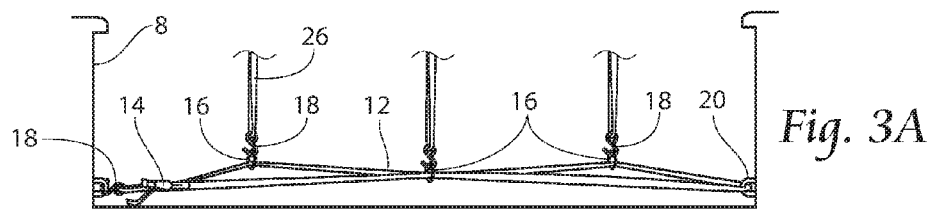
FIG. 3A is a side view of a single strap webbing through a pair of rings, and a double strap webbing through a center ring of the system.

In a preferred embodiment as shown in FIG. 3A, a side view of a single strap webbing 12 is shown through a pair of rings 18, both left and right of a two scraps of webbing 12 through a center ring 18 of the system. This configuration is preferably used to assist the stability and equalization of the load weight on the anchor straps 12.

Figure 4:
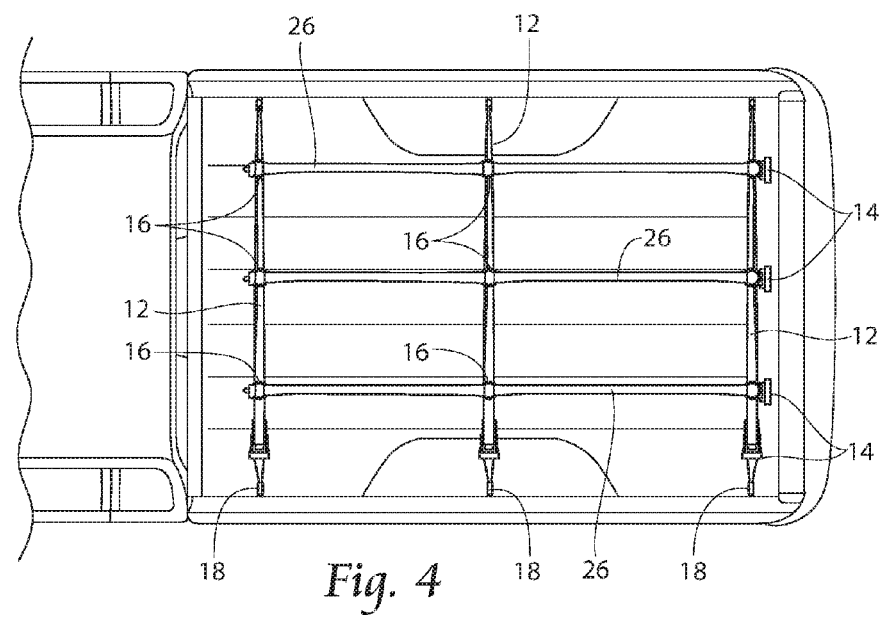
FIG. 4 is a top view of anchor and cross straps of the cargo net system of the present invention.
Figure 6A:
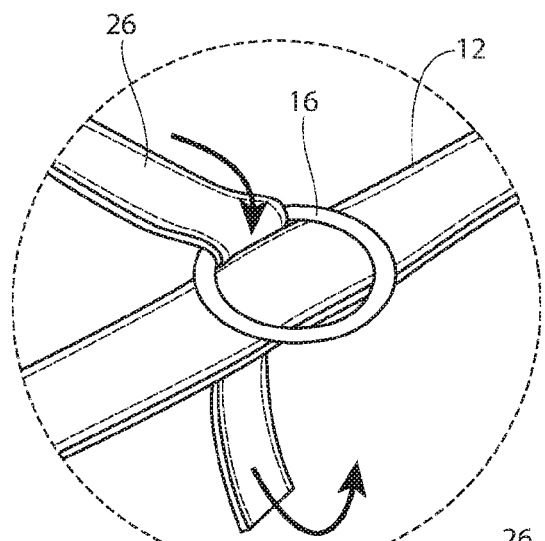
FIGS. 6A-6C are close-up in-sequence views of installation of a webbing lattice about anchor straps and rings of the present invention.
Figure 6B:
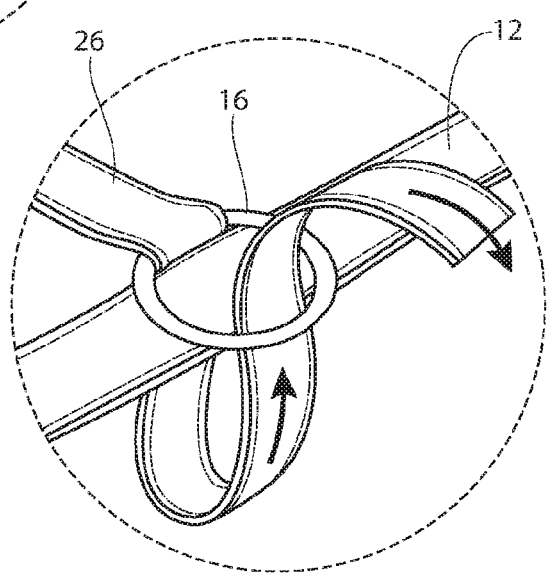
Figure 6C:
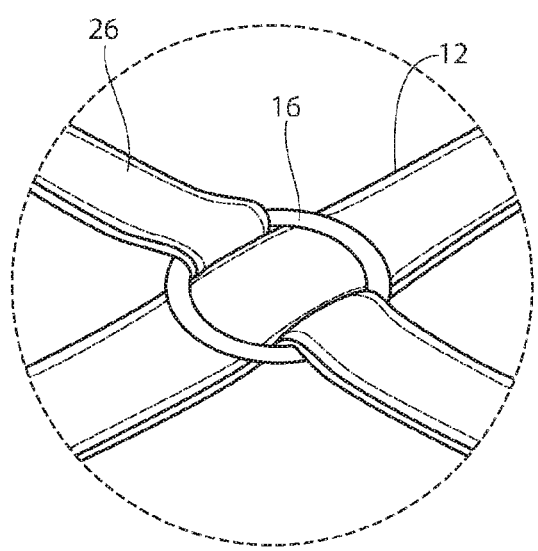
Figure 7:
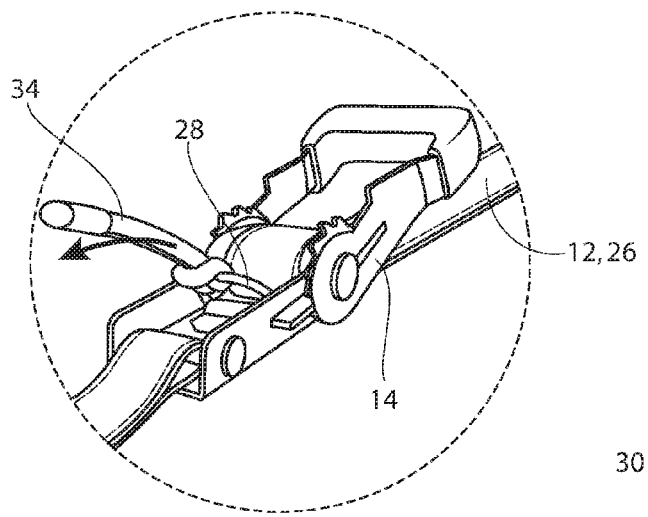
FIG. 7 is a perspective view of an improved D-ring of the present invention carried by a ratcheting strap system.
Figure 8A:
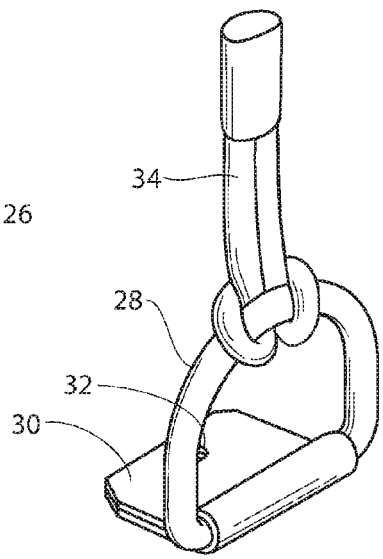
FIGS. 8A-8C are views of an improved D-ring of the present invention.
Figure 8B:
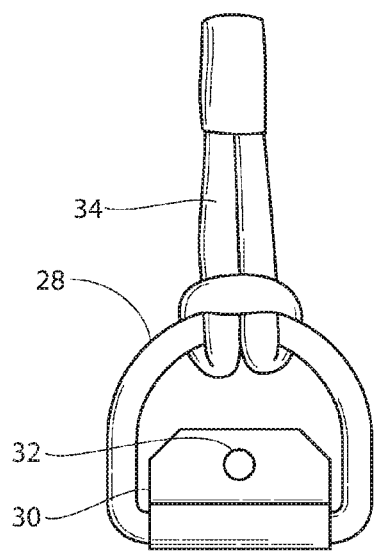
Figure 8C:
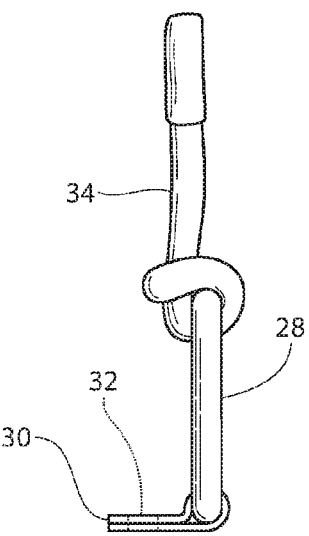

As shown in FIG. 4, a grid of anchor straps 12 and lateral straps 26 is created by coupling straps 26 to straps 12 from the front to the back of the cargo bed to create a flexibly sized and configured cargo securement lattice. In this step, S-hooks 18 carried by lateral straps 26 are first coupled to the front bottom anchor strap 12 about the rings 16 carried by front bottom anchor strap 12, and then fed first vertically to front top anchor strap 12, and referring now to the sequence shown in FIGS. 6A-6C, in-sequence views of installation of a webbing lattice of lateral straps 26 about anchor straps 12 and rings 16 of the present invention are shown. First, rings 16 are placed atop straps 12, and a free end of lateral strap 26 is threaded over a first portion of ring 16, next under anchor strap 12, and then up through ring 16, and the free end of lateral strap 26 is slidably advanced as shown in FIG. 6B, and pulled taut as shown in FIG. 6C. This sequence is repeated for as many lateral straps 26 as desired, e.g., for three lateral straps 26 about three anchor straps 12, as shown in FIG. 4. Of course, more or less scraps 12 or 26 can be used according to user preference. Last, s-hooks 18 carried by lateral straps 26 are fed downward vertically and coupled to the rear bottom anchor straps 12 about the rings 16 carried by front bottom anchor strap 12. Additional ratcheting mechanisms 14 can then be employed to tighten the straps 12 and 26 of the system as desired. Alternatively, lower anchor strap 12 of FIG. 5 could alternatively be provided with a hook 18 as opposed to threaded webbing 12 as shown.

Rings 16 can be slidably positioned laterally about either of straps 12 and 26 for adjustability of the system 10.

Figure 9:
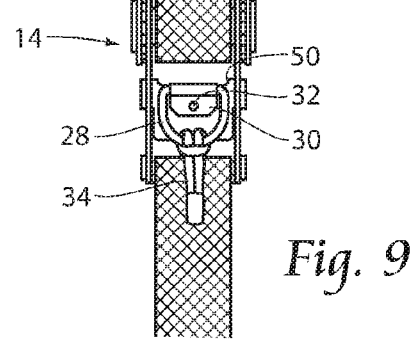
FIG. 9 is a top view of an improved D-ring of the present invention carried by a ratcheting strap system.

Referring now to FIG. 7, and FIGS. 8A-8C an improved ratcheting strap system 14 of the present invention is shown. Namely, referring now to FIG. 9, D-ring 28 carrying a hand operated pull strap 34 is coupled to a pull bar 50 of ratcheting mechanism 14 to release tension on the ratcheting mechanism 14. A D-ring pivot plate a pivotally carries a ring of D-ring 28, and a D-ring pivot plate securement hole 32 is provided to couple the D-ring 28 to a solid portion of ratcheting mechanism 14.

The foregoing is considered as illustrative only of the principles of the invention. Furthermore, since numerous modifications and changes will readily occur to those skilled in the art, it is not desired to limit the invention to the exact construction and operation shown and described. While the preferred embodiment has been described, the details may be changed without departing from the invention, which is defined by the claims.

I claim:

1. In a ratchet strap system comprising a strap of webbing material, a series of teeth rotatably engaged by a ratcheting handle, said series of teeth controllably positioning said strap of webbing material, and a pawl selectively engaged with said teeth, the improvement comprising a plate carried by said pawl, said plate rotatably carrying a ring structure, said ring structure slidably selectively engaging said pawl and said teeth.

2. The ratchet strap system of claim 1, said plate further comprising a pawl engaging surface and a channel coupled to said pawl engaging surface, said channel adapted to receive and rotatably carry said ring structure.

3. The ratchet strap system of claim 1, said plate further comprising a pawl engaging surface and a pivot plate securement hole to carry a coupling mechanism between said plate and said pawl.

4. The ratchet strap system of claim 1, said ring structure comprising a D-ring, said D-ring further carrying a pull strap.

\* \* \* \* \*